May 27, 1930.  N. P. HARSHBERGER  1,759,901
COMPOSITION SHINGLE
Filed Sept. 30, 1926   3 Sheets-Sheet 1

INVENTOR:
Norman P. Harshberger
By E. J. Andrews
Atty.

INVENTOR:
Norman P. Harshberger
By E. J. Andrews
Atty.

May 27, 1930.  N. P. HARSHBERGER  1,759,901
COMPOSITION SHINGLE
Filed Sept. 30, 1926  3 Sheets-Sheet 3

INVENTOR:
Norman P. Harshberger
By E. J. Andrews
Att'y.

Patented May 27, 1930

1,759,901

UNITED STATES PATENT OFFICE

NORMAN P. HARSHBERGER, OF CHICAGO, ILLINOIS

COMPOSITION SHINGLE

Application filed September 30, 1926. Serial No. 138,598.

This invention relates to composition shingles, and has for its object providing a method for making an improved type of composition shingle. The invention also consists in providing an improved shingle, whether or not made according to my method, which is in general the shape of many ordinary shingles, but which has its lower or lapping edge materially stiffened so as to prevent warping or bending up of the exposed edge, and thus to eliminate the need of locking this edge down to the underlying shingles, as is now common practice. A further object is to form the shingles so as to provide material air spaces between the shingles. Other objects of my method, and of the shingle which I provide, will be apparent from a consideration of the following drawings and accompanying description thereof.

Figure 1:
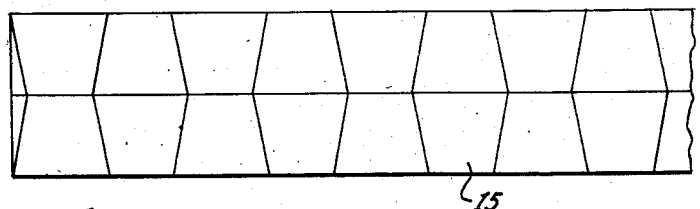
Figure 2:
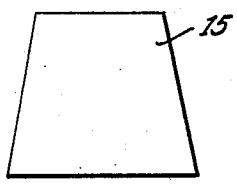
Figure 3:
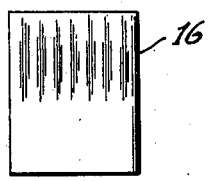
Figure 5:
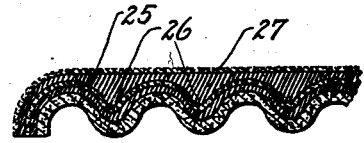
Figure 4:
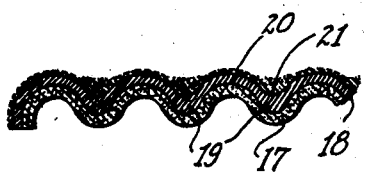
Figure 6:
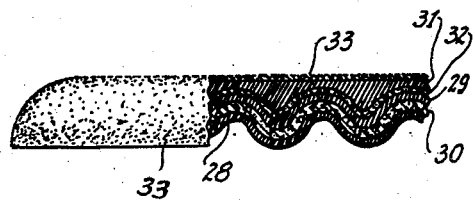
Figure 7:
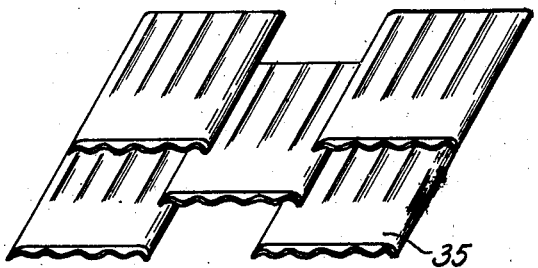
Figure 8:
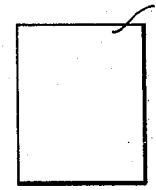
Figure 9:
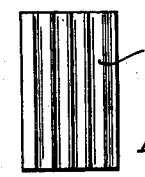
Figure 10:
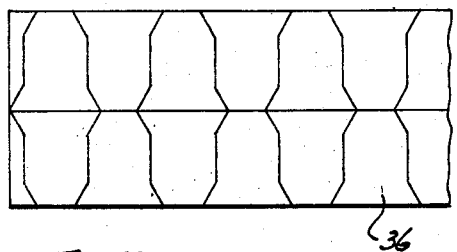
Figure 11:
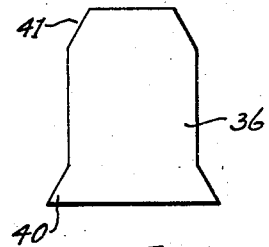
Figure 13:
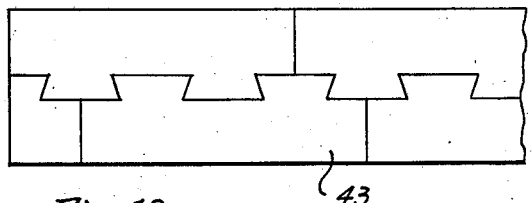
Figure 12:
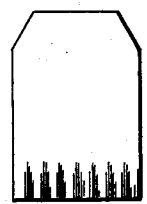
Figure 14:
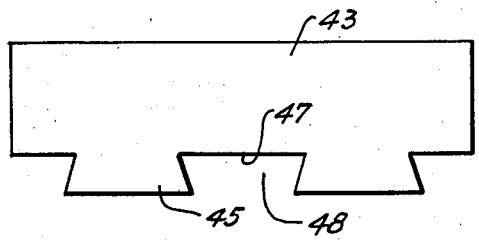
Figure 15:
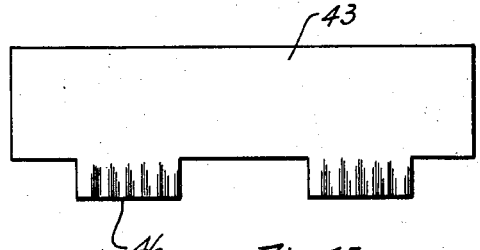
Figure 16:
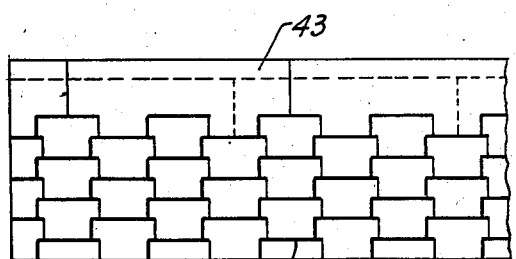
Figure 21:
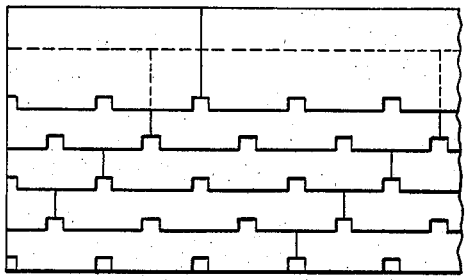
Figure 22:
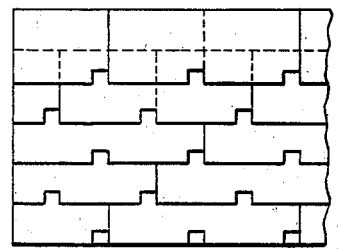

Fig. 1 is a plan view of a strip of shingle material showing how the shingles which I provide may be cut from the strip; Fig. 2 is an enlarged plan view of a single shingle before it has been processed; Fig. 3 is a plan view of the shingle after it has been processed; Fig. 4 is a materially enlarged fractional sectional end view of the processed shingle; Fig. 5 is a similar end view of a shingle processed somewhat differently; Fig. 6 is an end view partly in section of another modification; Fig. 7 is a perspective view of a number of the shingles as they appear when assembled; Figs. 8 and 9 are plan views of another modification. Fig. 10 is a plan view of a strip of shingle material showing how a modified form of shingle is cut therefrom; Fig. 11 is a plan view of an individual shingle of this modified form; Fig. 12 is a plan view of the shingle after it has been processed; Fig. 13 is a plan view of a strip of shingle material, showing another modified form; Fig. 14 is a plan view of one of these shingles; Fig. 15 is a plan view of this shingle after it has been processed; Fig. 16 is a plan view of the shingles of Fig. 15 as they appear when assembled on the roof; Figs. 17, 18, 19 and 20 are plan views of a modified form of strip shingle 6; and Figs. 21 and 22 illustrate how these and similar shingles may be assembled.

The type of shingle illustrated in Figs. 1 to 4 is formed by cutting from the strip of shingle material, in any suitable manner, individual shingles 15 which have one edge materially longer than the opposite edge. The first step in the process is to crimp these shingles so as to form corrugations 16 therein, these corrugations being materially greater near the wide end than at the other end, so as to leave the outline of the shingle substantially in the form of a parallelogram. However, it is to be understood that the shape of the outline of the shingle is not a material feature of my invention.

The shingle, when so cut and formed, may consist of a single thickness of felt, 17, which preferably has been impregnated in an ordinary manner with asphalt or other suitable material. The shingles after being crimped are then coated on the upper surface with asphalt 18 or other suitable material, and in so coating, the asphalt accumulates at the points 19, filling in more or less the corrugations at these points, especially at the end of the shingle. The shingle is then coated with granulated mineral, such as the granulated slate 20, and this also tends to accumulate in the corrugations, at the points 21, so that the corrugations, or valleys between the ridges, particularly at the ends of the shingles, are substantially filled with asphalt and slate, the upper surface of this edge being nearly level.

This method of forming the shingles thus provides for a very thick edge at the lower end of the shingle, this edge being the lower edge when the shingles are on the roof as indicated in Fig. 7, and thus the edge and the shingle for some distance upwardly is much stiffer than ordinarily, and the danger of being bent upward by the action of the weather or otherwise is substantially eliminated. This method of forming the shingles also produces a very thick exposed edge which gives a distinctive and tile-like appearance to the roof. Furthermore, the corrugations on the under side of the shingle provide air cells or spaces between the shingles which materially increase the insulation properties of the roof.

A somewhat modified process of forming these shingles is indicated by Fig. 5. In this case the strips of shingle material are impregnated and coated with asphalt and granulated slate or other suitable materials in any suitable or ordinary manner before being cut into individual shingles. The shingles are then cut and crimped as hereinabove explained, and they are then coated on the upper side, particularly at the lower edges, and, if desired, over the lap portion of the shingle, with a coat of asphalt 25, which is sufficiently thick to fill in the grooves 26 so that the upper surface is more or less level. On this surface is then sprinkled a coat of mineral 27, which thus forms a coat similar to the ordinary coat of mineral on composition shingles. It will be understood, however, that this extra coat of asphalt and mineral may be over the entire upper surface of the shingle or may cover merely the lap portion, or so much as may be desired. In case of this type of shingle, the thickness of the exposed edge is increased over that of the type of Fig. 4, and the shingle is proportionally stiffer and more definite in design.

A further step in my process consists in applying the asphalt to the corrugated lower edge of the shingles so that it runs over the edges and forms beads or a filler in the grooves on the under side of the shingle, as indicated in Fig. 6, which is a sectional view of the end immediately back of the slate 33 which also runs over the end of the felt. In this case the shingles consist of a layer of impregnated felt 30, coats of asphalt 28 and 29 on each side of the felt, and the coat of mineral 32 which may be originally placed on the strip of shingle material. In addition there are the additional coats of asphalt 31, and the final coat of mineral 33. This mineral also, if suitably applied, will adhere to the coat of asphalt on the end of the shingles and also to the beads on the lower side as indicated in the left hand end of the figure.

Fig. 7 shows one way of assembling these shingles, particularly the shingles illustrated in Figs. 4 and 5. But it is to be understood that these shingles may be assembled in any suitable or ordinary manner. When assembled as indicated the roof is thoroughly protected from the weather, and a minimum amount of shingle material is used, as the lapping on the side edges may be much less than normal owing to the nesting together of the edge corrugations as indicated. The rain cannot be driven upwardly over the corrugations, and even if so it would need to pass back and over another corrugation before it could reach the roof. This method of assembling is possible not only because of the corrugations which prevent leakage, but also because of the increased stiffness of the shingle, which prevents deformation thereof under stress of the weather or otherwise.

Figs. 8 and 9 illustrate a modification of these shingles. These shingles are cut from sheets in the form of rectangle sheets 23, and these sheets are fluted or crimped longitudinally uniformly all the way across from end to end, forming corrugated sheets 34. One end of each of these sheets is then processed as hereinabove described and shown in Figs. 4, 5, or 6, and the shingles may then be laid as shown in Fig. 7. Preferably these shingles are coated after being crimped about one third of their length so that the lap portion 35 has the corrugations on the upper surface substantially filled in level.

Figs. 10 to 12 inclusive illustrate a modified type of shingle 36 which is cut from the sheet, as indicated in Fig. 10, and when cut, before being processed, is as indicated in Fig. 11. In this case the crimping is limited to what is the lower edge of the shingle and is sufficient merely to produce a shingle with a contour as indicated in Fig. 12. By varying the size of the wings 40 it is apparent that the thickness of the shingle at the lower edge may be made as much as desired. These wings 40 are produced by cutting off the corners 41 of the adjacent shingles. The material cut from the corners 41 is of no value in protecting the roof as this portion is entirely covered by other shingles. These shingles of Figs. 10 to 12 may be processed as hereinabove described or in any other suitable manner.

Figs. 13 to 16 inclusive illustrate another type of shingle 43 which is ordinarily called a strip shingle. In this case the shanks or lap portions 45 are cut with diverging edges. These lap portions are homologous with the recesses 48, and hence, the shingles may be cut from the sheets as indicated in Fig. 13. After being cut into the strip shingles the lap portions, or shanks 45 are crimped as indicated in Fig. 15, so as to form laps with substantially parallel sides. The lap portion, or so much of the shingle as may be desired, is then processed as hereinabove described with reference to the other shingles, or in any other suitable manner. These strip shingles may be assembled on the roof as indicated in Fig. 16, or in any other suitable manner. By assembling as indicated, the processed edges 46 are positioned flush with the edges 47 of the underlying shingles, so that, at this edge the shingles are of double thickness, and the distinctiveness of the edge is materially amplified.

It will therefore be seen that I have, by my improved process, provided an improved type of shingle which may be very quickly and conveniently laid on the roof, as in each case there are portions of the shingle which provide positioning means for laying the shingles. In case of the shingles of Fig. 7 the corrugations at once determine the amount of side lap of the shingles, and in case of the shingles of Fig. 16, the position may be exactly determined by placing the lower edges 46, as described, flush with the edge 47 of the underlying shingle and at the center of the recess 48. And in each case the stiffness of the exposed edge of the shingle insures its clinging closely at all times to the roof, and the corrugations provide air spaces for greater insulation. And also the process lends itself to the formation of shingles which may be almost any desired shape and appearance.

Figure 17:
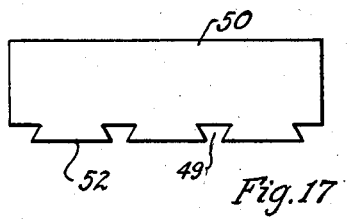
Figure 18:
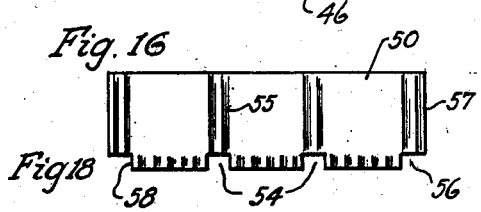
Figure 19:
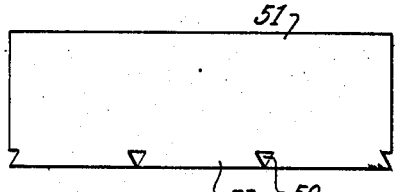
Figure 20:
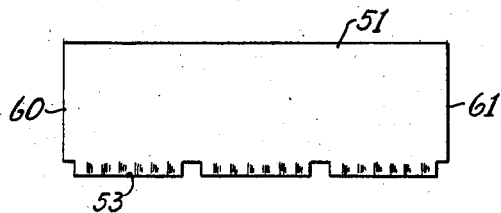

Figs. 17 to 22 illustrate a somewhat modified type of shingle. Figs. 17 and 19 show plan view of the shingles 50 and 51 when first cut. Triangular-shaped recesses 49 and 59 are cut in the edges of these shingles, which correspond to the recesses 48 of the shingles 43, except that these recesses 49 and 59 are much narrower than the recesses 48. But the recesses have the slanting sides, and the projecting or shank portions 52 and 53 are fluted so as to ultimately make the sides of the recesses substantially parallel, as is shown by the respective Figs. 18 and 20. Also, in case of the shingle 50, the entire shingle is fluted opposite the recesses 54, parallel and uniform transverse corrugations 55 being made therein, so that the recesses are narrowed by the fluting. One object of these transverse corrugations 55, is to improve the appearance of the shingle and also to provide more efficient lapping means. These shingles are laid, as indicated in Fig. 22, with the ends lapping, preferably with two corrugations meeting. The end recesses or notches 56 are of such length that, by lapping until the edge 57 of one shingle registers with the edge 58 of the adjacent shingle, the recesses at the lapping ends will be the same length as the recesses 54.

The shingle 51 when first cut has still narrower recesses, as these shingles are not fluted transversely opposite the recesses. The shanks 53, however, are fluted so as to produce recesses with parallel sides. These shingles are preferably laid as indicated in Fig. 21, with the edge 60 of one shingle abutting with the edge 61 of the adjacent shingle.

Although I have herein, and particularly in the following claims, referred to asphalt as a suitable substance for coating the shingles, yet it is to be understood that any other suitable substance may be used, and particularly any bituminous compound.

I claim as my invention:

1. A method of forming shingles consisting in cutting from sheets of shingle material individual pieces, each piece having one edge materially longer than the opposite edge, and in then crimping the long edge so that it is substantially the same length across as is the main body of the shingle.

2. A shingle having one end substantially flat, and the other end corrugated, with the corrugations extending inwardly towards the said flat end and decreasing in size as said flat end is approached, a coat of asphalt on one side of the corrugated end, and a coat of granulated mineral on the coat of asphalt, the said coats being thicker in the grooves than on the ridges.

3. A shingle having one end substantially flat, and the other end corrugated, with the corrugations extending inwardly towards the said flat end and decreasing in size as said flat end is approached, a coat of asphalt on one side of the corrugated end, and a coat of granulated mineral on the coat of asphalt, the said coats being thicker in the grooves than on the ridges, and extending entirely over the edge, the entire edge being substantially smooth.

In testimony whereof, I hereunto set my hand.

NORMAN P. HARSHBERGER.